United States Patent
Kim et al.

(10) Patent No.: US 8,514,800 B2
(45) Date of Patent: Aug. 20, 2013

(54) METHOD FOR TRANSMITTING AND RECEIVING ETHERNET DATA BETWEEN DIGITAL UNIT AND RF UNIT AND APPARATUS THEREOF

(75) Inventors: Keun-Bok Kim, Suwon-si (KR);
Chang-Won Kim, Suwon-si (KR);
Han-Ul Moon, Suwon-si (KR);
Chang-Won Choi, Seoul (KR)

(73) Assignee: Samsung Electronics Co., Ltd., Suwon-si (KR)

(\*) Notice: Subject to any disclaimer, the term of this patent is extended or adjusted under 35 U.S.C. 154(b) by 260 days.

(21) Appl. No.: 13/009,353

(22) Filed: Jan. 19, 2011

(65) Prior Publication Data
US 2011/0182255 A1  Jul. 28, 2011

(30) Foreign Application Priority Data
Jan. 27, 2010 (KR) .................. 10-2010-0007625

(51) Int. Cl.
*H04W 4/00* (2009.01)
(52) U.S. Cl.
USPC ......................................... 370/329; 370/328
(58) Field of Classification Search
USPC ........................................................ 370/329
See application file for complete search history.

(56) References Cited

U.S. PATENT DOCUMENTS

| | | | |
|---|---|---|---|
| 5,959,660 A | 9/1999 | Levan | |
| 2007/0147488 A1* | 6/2007 | Han | 375/222 |
| 2008/0069032 A1* | 3/2008 | Liu | 370/328 |
| 2008/0225816 A1* | 9/2008 | Osterling et al. | 370/342 |
| 2011/0032910 A1* | 2/2011 | Aarflot et al. | 370/335 |

FOREIGN PATENT DOCUMENTS

| | | |
|---|---|---|
| KR | 10-2007-0023012 A | 2/2007 |
| KR | 10-0746039 B1 | 8/2007 |
| KR | 10-2009-0116112 A | 11/2009 |

\* cited by examiner

*Primary Examiner* — Noel Beharry
(74) *Attorney, Agent, or Firm* — Jefferson IP Law, LLP (57) ABSTRACT

A method for transmitting Ethernet data in a Digital Unit (DU) that processes a baseband and interfaces with at least two Radio Frequency (RF) Units (RUs) is provided. The method includes setting location information of two or more Ethernet channels in a first subchannel of a radio frame, allocating the two or more Ethernet channels in second subchannels of the radio frame, using the location information, and transmitting the radio frame to the at least two RUs.

26 Claims, 9 Drawing Sheets

METHOD FOR TRANSMITTING AND RECEIVING ETHERNET DATA BETWEEN DIGITAL UNIT AND RF UNIT AND APPARATUS THEREOF

PRIORITY

This application claims the benefit under 35 U.S.C. §119 (a) of a Korean patent application filed in the Korean Intellectual Property Office on Jan. 27, 2010 and assigned Serial No. 10-2010-0007625, the entire disclosure of which is hereby incorporated by reference.

BACKGROUND OF THE INVENTION

1. Field of the Invention

The present invention relates to a method and apparatus for transmitting and receiving data in a wireless communication system. More particularly, the present invention relates to a method for transmitting and receiving Ethernet data between a Digital Unit (DU) and a Radio Frequency (RF) Unit (RU), of a base station (or Node B), and an apparatus thereof.

2. Description of the Related Art

Presently, research is being conducted on wireless communication systems to provide users with high-speed services having a variety of Quality of Service (QoS) classes. In the field of wireless communication systems, active research is being made to support high-speed services designed to guarantee mobility and QoS for Broadband Wireless Access (BWA) communication systems such as a Local Area Network (LAN) system and a Metropolitan Area Network (MAN) system.

A base station supporting a wireless communication system includes a Digital Unit (DU) for processing a baseband and an RF Unit (RU) for processing an RF analog radio signal. The base station includes one DU and at least one RU. The DU and the at least one RU may be a single unit, or may be arranged separately. An RU separated from the DU and under control of the DU is called a Remote Radio Frequency Unit (RRU), and a base station may be constructed by connecting a plurality of RRUs to one DU. The one DU and the plurality of RRUs may be combined in a star structure or a cascade structure, and are connected by optical cables. For the DU and RRU, standardization for compatibility and connectivity (or interface) between a variety of communication systems is in progress. Common Public Radio Interface (CPRI) is an example of such a standard.

A CPRI link based on the CPRI standard includes In-phase/Quadrature (I/Q) data that is actually transmitted and received via an antenna, control data for Control & Management (C&M), and synchronous data for synchronization acquisition, and this data is multiplexed in the time domain for transmission and reception. One DU and a plurality of RRUs are connected (or interfaced) through at least one CPRI link, and one CPRI link has one C&M channel. The C&M channel is an allocated channel over which a DU transmits data for controlling and managing operations of a plurality of RRUs. The C&M channel may include an Ethernet channel, a High-level Data Link Control (HDLC) channel, a Universal Asynchronous Receiver/Transmitter (UART) channel, etc. The Ethernet channel is typically used.

Since a plurality of RRUs connected to one DU in the form of a cascade are controlled and managed through an Ethernet path of a CPRI link, each of the plurality of RRUs has an Ethernet switch to control a flow of the Ethernet path. Currently, one Ethernet channel is allocated to one CPRI link, and a processing capability of the Ethernet channel is determined according to CPRI line bit rates defined in the physical layer specification as in Table 1 below.

TABLE 1

| CPRI line bit rate [Mbit/s] | Length of CW [bit] | CW constituting bytes with indexes | Minimum Ethernet rate [Mbit/s] | Maximum Ethernet Rate [Mbit/s] |
| --- | --- | --- | --- | --- |
| 614.4 | 8 | Z.X.0 | 0.48 | 21.12 |
| 1228.8 | 16 | Z.X.0, Z.X.1 | 0.96 | 42.24 |
| 2457.6 | 32 | Z.X.0, Z.X.1, Z.X.2, Z.X.3 | 1.92 | 84.48 |
| 3072.0 | 40 | Z.X.0, Z.X.1, Z.X.2, Z.X.3, Z.X.4 | 2.4 | 105.6 |
| 4915.2 | 64 | Z.X.0, Z.X.1, Z.X.2, Z.X.3, Z.X.4, Z.X.5, Z.X.6, Z.X.7 | 3.84 | 168.96 |
| 6144.0 | 80 | Z.X.0, Z.X.1, Z.X.2, Z.X.3, Z.X.4, Z.X.5, Z.X.6, Z.X.7, Z.X.8, Z.X.9 | 4.8 | 211.2 |

Ethernet rates now used in most commercial systems are below 10 Mbps. The C&M channel is mainly used only for control and management of RRUs and remote downloading, and capacities required for these operations are 10 Mbps or below.

However, as illustrated in Table 1, data processing capabilities allocated for the Ethernet range from a minimum of 21.12 Mbps to a maximum of 211.2 Mbps depending on CPRI line bit rates. Even though an operation of a C&M channel may be sufficiently carried out with the maximum Ethernet rate of 21.12 Mbps supported at an initial CPRI line bit rate of 614.4 Mbps, an Ethernet channel of as high as 211.2 Mbps is allocated at a CPRI line bit rate of 6144.0 Mbps.

Assuming that the currently used reference Ethernet rate is 10 Mbps, an Ethernet path having a CPRI line bit rate of 614.4 Mbps may connect two RRUs since its maximum Ethernet rate is 21.2 Mbps, and an Ethernet path having a CPRI line rate of 2457.6 Mbps may connect eight RRUs since its maximum Ethernet rate is 84.48 Mbps. As a result, data transmission/reception over the current Ethernet channel causes a waste in terms of using communication infrastructures. Therefore, there is a desire to address the waste of resources for Ethernet channels supported by CPRI links.

SUMMARY OF THE INVENTION

An aspect of the present invention is to address at least the above-mentioned problems and/or disadvantages and to provide at least the advantages described below. Accordingly, an aspect of the present invention is to provide an apparatus and method for transmitting and receiving Ethernet data using a plurality of Ethernet pointers in a base station including a Digital Unit (DU) and at least one Remote Radio Frequency (RF) Unit (RRU).

Another aspect of the present invention is to provide an apparatus and method for dividing one Ethernet channel into a plurality of Ethernet channels by setting a plurality of Ethernet pointers, and transmitting and receiving Ethernet data using the plurality of divided Ethernet channels in a base station including a DU and at least one RRU.

In accordance with an aspect of the present invention, a method for transmitting Ethernet data in a DU that processes a baseband and interfaces with at least two RF Units (RUs) is provided. The method includes setting location information of two or more Ethernet channels in a first subchannel constituting a radio frame, allocating the two or more Ethernet channels in second subchannels of the radio frame, based on the location information, and transmitting the radio frame to the at least two RUs.

In accordance with another aspect of the present invention, a DU for transmitting Ethernet data and for processing a baseband and interfacing with at least two RUs is provided. The unit includes a controller for setting location information of two or more Ethernet channels in a first subchannel of a radio frame, and an Ethernet interface for allocating the two or more Ethernet channels in second subchannels of the radio frame, based on the location information, and for transmitting the radio frame to the at least two RUs.

In accordance with another aspect of the present invention, a method for receiving Ethernet data in an RU that processes a radio signal and interfaces with a DU is provided. The method includes receiving a radio frame from the DU, detecting location information of an Ethernet channel allocated to the RU from location information of two or more Ethernet channels, which are set in a subchannel of the radio frame, and Ethernet data is detected based on the Ethernet channel indicated by the detected location information.

In accordance with another aspect of the present invention, an RU for receiving Ethernet data and for processing a radio signal and interfacing with a DU is provided. The unit includes an Ethernet interface for receiving a radio frame from the DU, for detecting location information of an Ethernet channel allocated to the RU from location information of two or more Ethernet channels, which are set in a subchannel of the radio frame, and for detecting Ethernet data based on the Ethernet channel indicated by the detected location information.

In accordance with another aspect of the present invention, a base station is provided. The base station includes a DU including a controller for setting location information of two or more Ethernet subchannels in a first subchannel of a radio frame and an Ethernet interface module for allocating the two or more Ethernet channels in second subchannels of the radio frame based on the location information, and for transmitting the radio frame; and at least two RUs, each RU including an Ethernet interface module for receiving the radio frame from the DU, for detecting the location information, and for detecting Ethernet data based on an Ethernet channel indicated by the location information.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, the same drawing reference numerals will be understood to refer to the same elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding, but these are to be regarded as merely exemplary. Accordingly, those of ordinary skill in the art will recognize that various changes and modifications can be made without departing from the scope and spirit of the invention. In addition, descriptions of well-known functions and constructions are omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention is provided for illustration purposes only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

According to exemplary embodiments of the present invention, a Digital Unit (DU) may be called a BaseBand Unit (BBU) or a Radio Equipment Control (REC), and a Remote Radio Frequency (RF) Unit (RRU) corresponding thereto may be called a Remote Radio Head (RRH) or a Radio Equipment (RE).

Exemplary embodiments of the present invention relate to an apparatus and method for transmitting and receiving Ethernet data using a plurality of Ethernet pointers in a base station. An exemplary embodiment of the present invention provides an apparatus and method for dividing one Ethernet channel into a plurality of Ethernet channels by setting a plurality of Ethernet pointers, and transmitting and receiving Ethernet data using the plurality of divided Ethernet channels.

Exemplary embodiments of the present invention will be described below with reference to the accompanying drawings.

Figure 1:
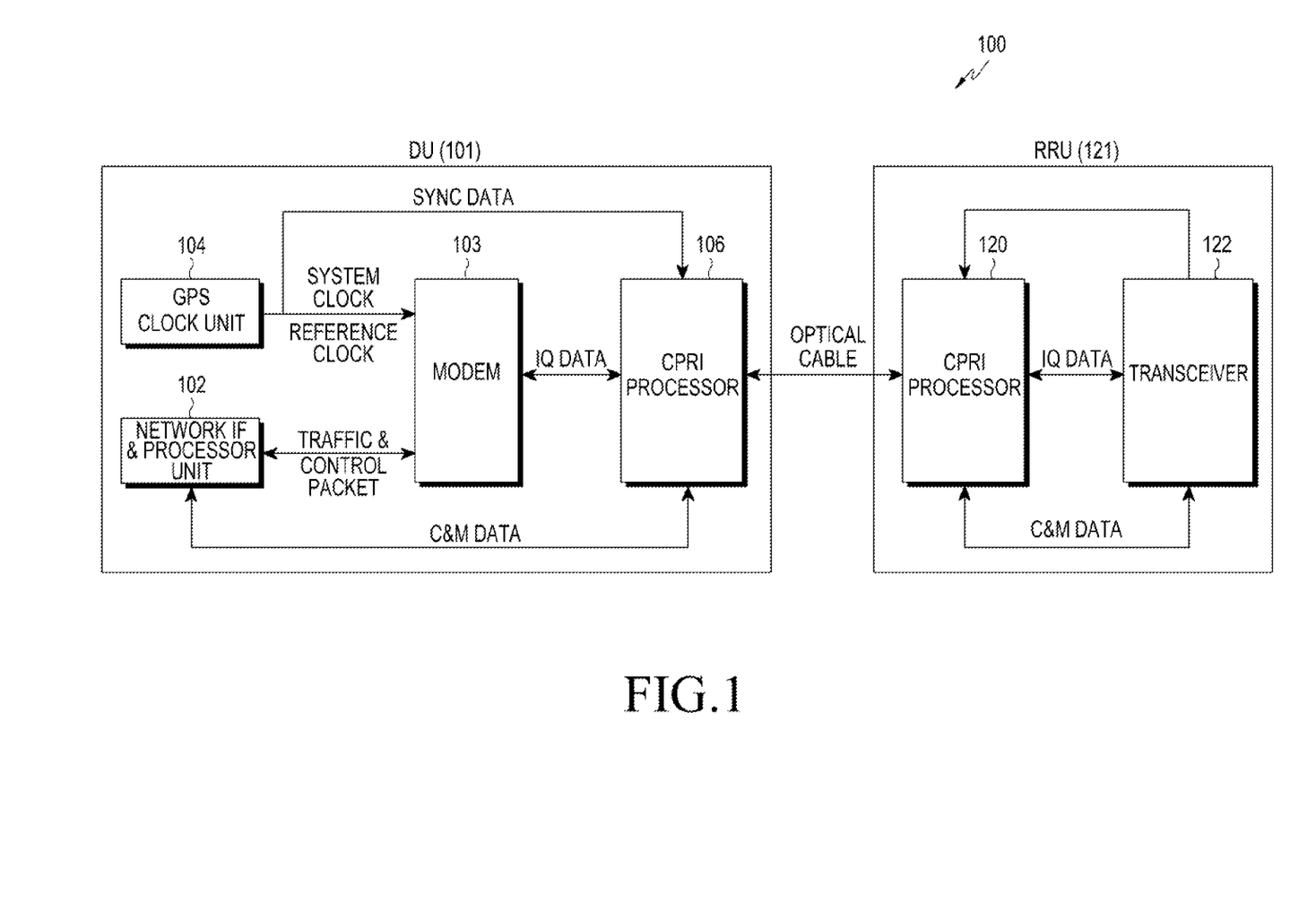
FIG. 1 is a diagram illustrating a structure of a base station according to an exemplary embodiment of the present invention.

FIG. 1 illustrates a structure of a base station according to an exemplary embodiment of the present invention.

Referring to FIG. 1, a base station 100 includes a DU 101 and an RRU 121. The DU 101 includes a modem 103, a network Intermediate Frequency (IF) & processor unit 102, a Global Positioning System (GPS) clock unit 104 for generating a system clock, and a Common Public Radio Interface (CPRI) processor 106. The RRU 121 includes a CPRI processor 120 and a transceiver 122. Optionally, the DU 101 and the RRU 121 may be connected by an optical cable, but other cables may also be employed. Other components of the DU 101 and the RRU 121 unrelated to exemplary embodiments of the present invention will not be described below.

The GPS clock unit 104 generates a system clock and inputs the system clock to the modem 103 and the CPRI processor 106. The modem 103 generates I/Q sample data synchronized with the system clock input from the GPS clock unit 104 and a reference clock, and transfers the I/Q sample data to the CPRI processor 106.

The network IF & processor unit 102 transfers data for controlling and managing the RRU 121 to the CPRI processor 106.

The CPRI processor 106 in the DU 101 synchronizes its operation to the system clock input from the GPS clock unit 104, and maps I/Q data and C&M data to a CPRI radio frame. The CPRI processor 106 encodes the CPRI radio frame into specific bits, serializes the encoded radio frame, and transmits the serialized radio frame to the RRU 121.

The CPRI processor 120 in the RRU 121 deserializes the serialized data received from the DU 101, and decodes the deserialized data into specific bits, thereby reconstructing the data. Once the data is reconstructed in the form of a frame, the CPRI processor 120 extracts I/Q data and C&M data from the frame, and transfers the extracted data to the transceiver 122.

When reconstructing data in the form of a frame, the CPRI processor 120 extracts a system clock using a Clock and Data Recovery (CDR) function, and extracts a reference clock from synchronization and timing information of the frame.

Figure 2:
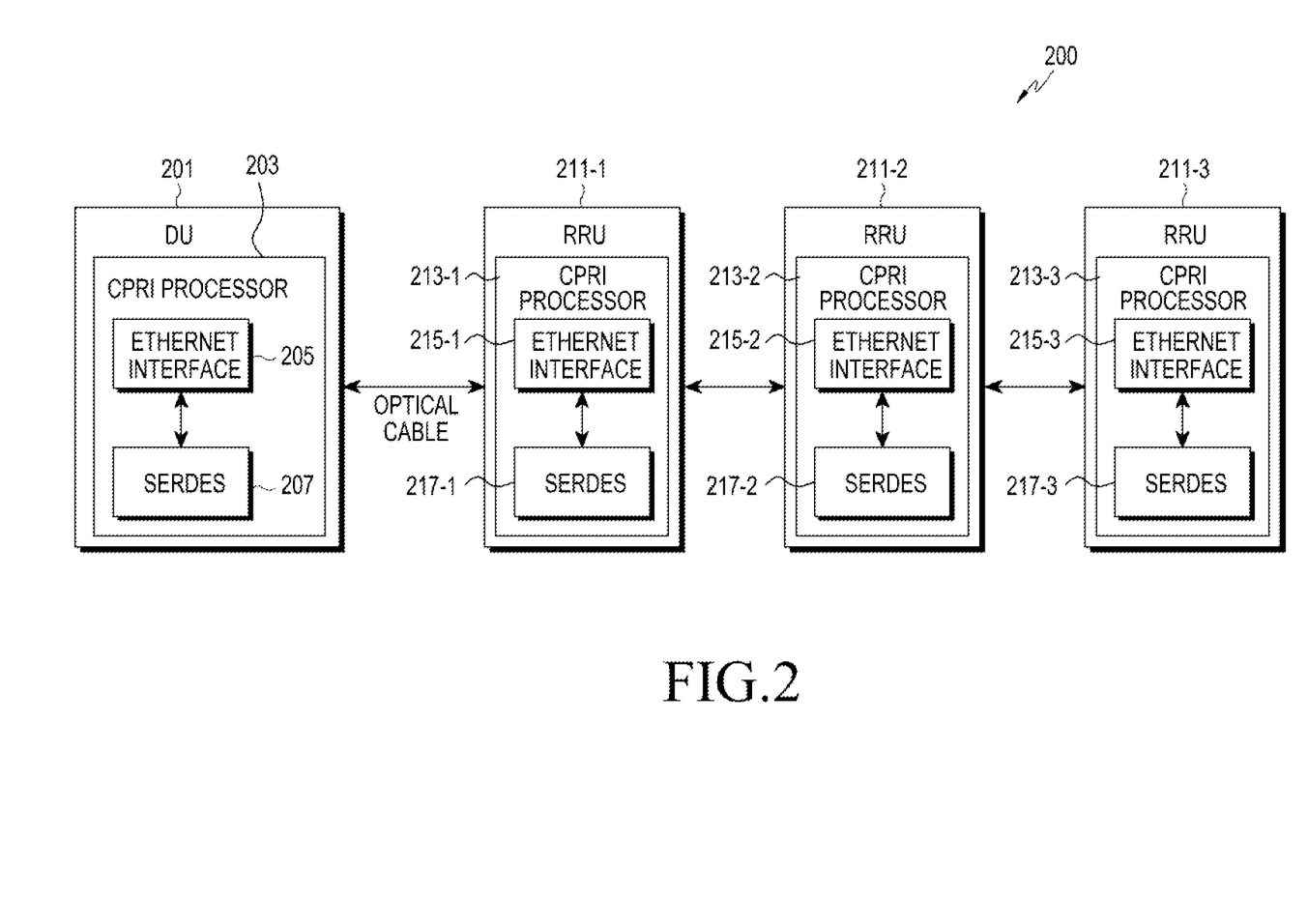
FIG. 2 is a diagram illustrating an interface structure of a Control and Management (C&M) channel in a base station according to an exemplary embodiment of the present invention.

FIG. 2 illustrates an interface structure of a Control and Management (C&M) channel in a base station according to an exemplary embodiment of the present invention.

Referring to FIG. 2, a base station 200 includes one DU 201 and a plurality of RRUs 211_1~211_3. The one DU 201 and the plurality of RRUs 211_1~211_3 are coupled in the form of a cascade, and these units are connected by optical cables.

The one DU 201 and the plurality of RRUs 211_1~211_3 are connected (or interfaced) through at least one CPRI link, and one C&M channel exists in one CPRI link. While Ethernet or High-Level Data Link Control (HDLC) may be used to support a C&M channel in the CPRI link, it is assumed in the following description that an Ethernet channel is used.

A CPRI processor 203 in the DU 201 includes an Ethernet interface module 205 and a Serializer & Deserializer (SERDES) 207. A CPRI processor 213 in the RRU 211 also includes an Ethernet interface module 215 and an SERDES 217. For convenience of description, other components (which are not related to an interface of the C&M channel and are not shown) of the CPRI processors 203 and 213 will not be described below.

The Ethernet interface module 205 supports processing of Ethernet data for controlling and managing the plurality of RRUs 211. The Ethernet interface module 205 multiplexes data streams in the form of an Ethernet protocol, and may support an Ethernet rate of up to a maximum of 211.2 Mbps according to CPRI line bit rates. The SERDES 207 serializes data input from the Ethernet interface module 205 and data input from other interfaces (not shown), and transmits the serialized data stream to the plurality of RRUs 211_1~211_3.

The SERDESs 217_1~217_3 in the plurality of RRUs 211_1~211_3 deserialize the serialized data stream transmitted from the DU 201, and provide the deserialized data streams to the Ethernet interface modules 215_1~215_3.

Since each of the plurality of RRUs 211_1~211_3 is controlled and managed through an Ethernet path of one CPRI link, each of the Ethernet interface modules 215_1~215_3 of the plurality of RRUs 211_1~211_3 in the base station 200 employs an Ethernet switch (not shown) to control a flow of the Ethernet path, and each of the plurality of RRUs 211_1~211_3 may receive Ethernet data allocated thereto using the Ethernet switch.

Figure 3:
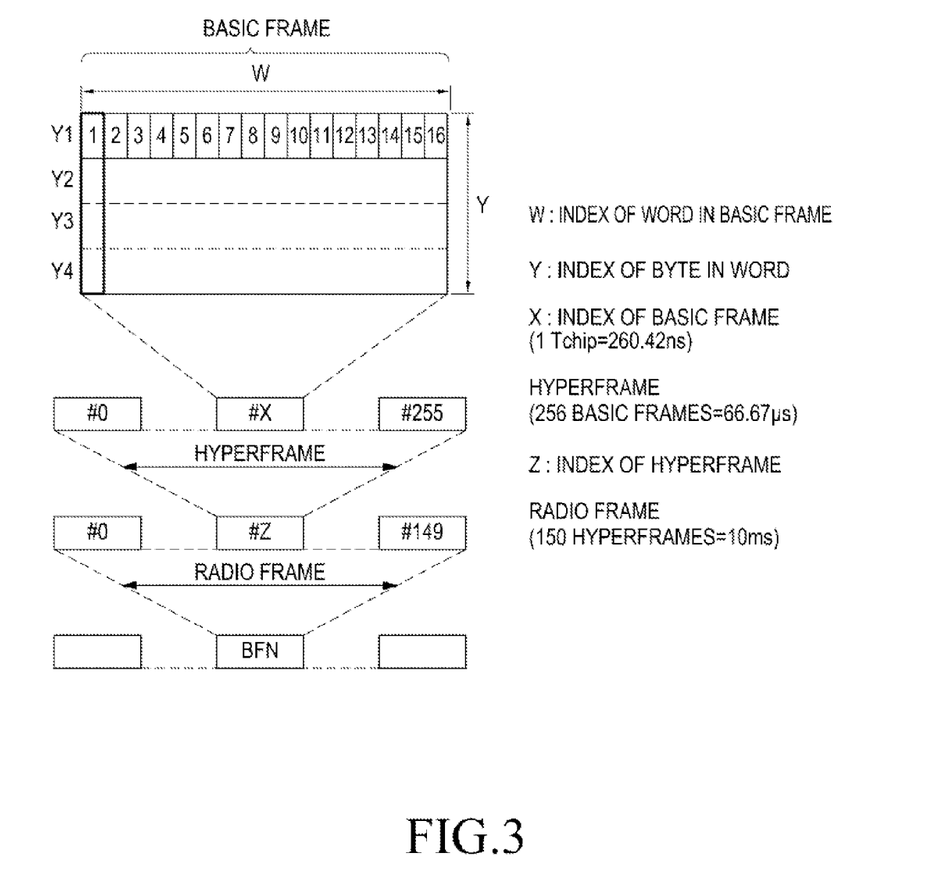
FIG. 3 is a diagram illustrating a structure of a Common Public Radio Interface (CPRI) radio frame according to an exemplary embodiment of the present invention.

FIG. 3 illustrates a structure of a CPRI radio frame according to an exemplary embodiment of the present invention.

Referring to FIG. 3, a CPRI radio frame is 10 ms in length, and includes 150 hyperframes. One hyperframe includes 256 basic frames. 'W' represents indexes of words in a basic frame, and 'Y' represents indexes of bytes in each word. An index of the basic frame is represented by 'X', and the basic frame corresponds to a single-chip period in the system.

An index of each hyperframe is represented by 'Z', and each hyperframe is 66.67 µs in length. The structure of the hyperframe is used to multiplex different control flows on a control time slit.

Figure 4:
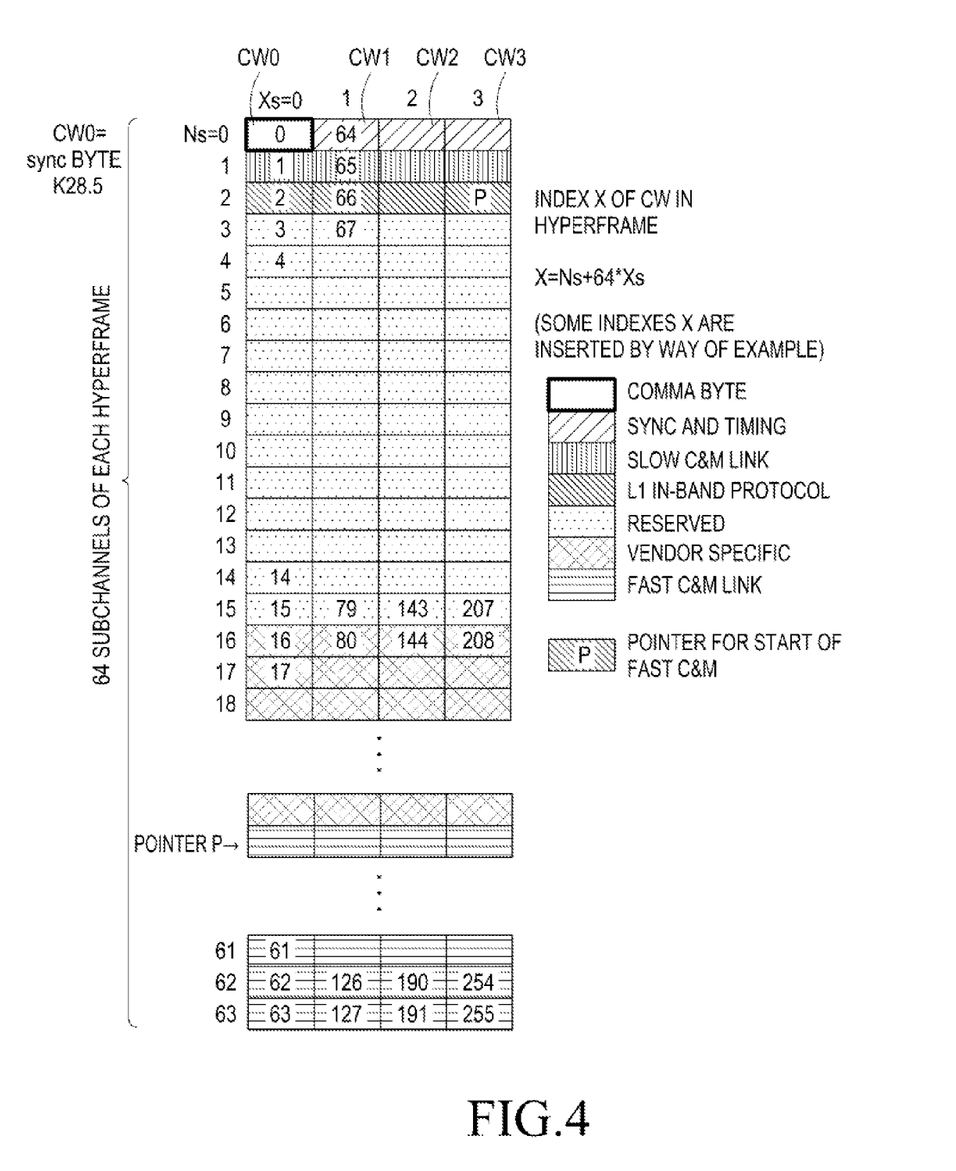
FIG. 4 is a diagram illustrating a subchannel structure of a hyperframe according to an exemplary embodiment of the present invention.

FIG. 4 illustrates a subchannel structure of a hyperframe according to an exemplary embodiment of the present invention.

Referring to FIG. 4, subchannels of the hyperframe are defined according to the CPRI standard so that several types of protocols may be used. An index Ns of the subchannel falls within a range of 0 to 63, and an index Xs of a Control Word (CW) in the subchannel has one of four possible values of 0, 1, 2, and 3. An index 'X' of each CW in a hyperframe is expressed as X=Ns+64*Xs.

As illustrated in FIG. 4, a sync time mark, called a sync byte, corresponds to a first control word/subchannel CW0 at Xs=0 and Ns=0. Synchronization and timing between a DU and an RRU are achieved by the RRU that detects a sync time mark included in the CW. Although a sync time mark at a time of every hyperframe is unique, it may be a known symbol.

A subchannel #0 carries a Hyper Frame Number (HFN) in CW1 and a NodeB Frame Number (BFN) in CW2 and CW3, and if transmitted through a radio interface, the BFN is used for identifying a radio frame in a radio signal.

A subchannel #1 includes a slow C&M link. The slow C&M link is based on HDLC, and has a bandwidth of 0.24, 0.48, or 0.96 Mbps at a line bit rate of 1228.8. The slow C&M link includes an HDLC frame returning a message of a protocol layer L2+.

A subchannel #2 includes in-band protocol information of Layer 1 (L1), including an interface version, a slow C&M link bit rate, an L1 control, and an L1 state. The final CW of the subchannel #2 includes a pointer 'P' (an Ethernet pointer) for a start of a fast C&M link, the pointer being a subchannel number falling within a range of 18 and 61. The Ethernet pointer may be defined in a predetermined location in the L1 in-band protocol.

Subchannels #3 to #15 are reserved for a frame or for other uses, and a subchannel #16 and succeeding subchannels include vendor-specific information.

A vendor-specific subchannel may include location information of an Ethernet pointer, i.e., information about a subchannel pointed by the Ethernet pointer. All subchannels succeeding the subchannel pointed by the Ethernet pointer are allocated for an Ethernet channel for a fast C&M channel. Therefore, it is possible to allocate Ethernet data to basic frames in a subchannel region pointed by the Ethernet pointer. In this regard, the maximum Ethernet rates defined in Table 1 correspond to the rates which are defined when the Ethernet pointer is put in its maximum location according to CPRI line bit rates.

To transmit Ethernet data, among 64 subchannels of a CPRI link, subchannels #20 to #63 may be used, optionally beginning with lower subchannels (i.e., in descending order of subchannel index). All of the subchannels #20 to #63 are used to transmit the maximum Ethernet data, and only one of them is used to transmit the minimum Ethernet data.

As described above, however, data transmission/reception over the Ethernet channel pointed by one Ethernet pointer causes a big waste in terms of using communication infrastructures. Therefore, in the following description, a proposed base station divides one Ethernet channel into a plurality of Ethernet channels by setting a plurality of Ethernet pointers, and transmits and receives data using the plurality of divided Ethernet channels.

Figure 5:
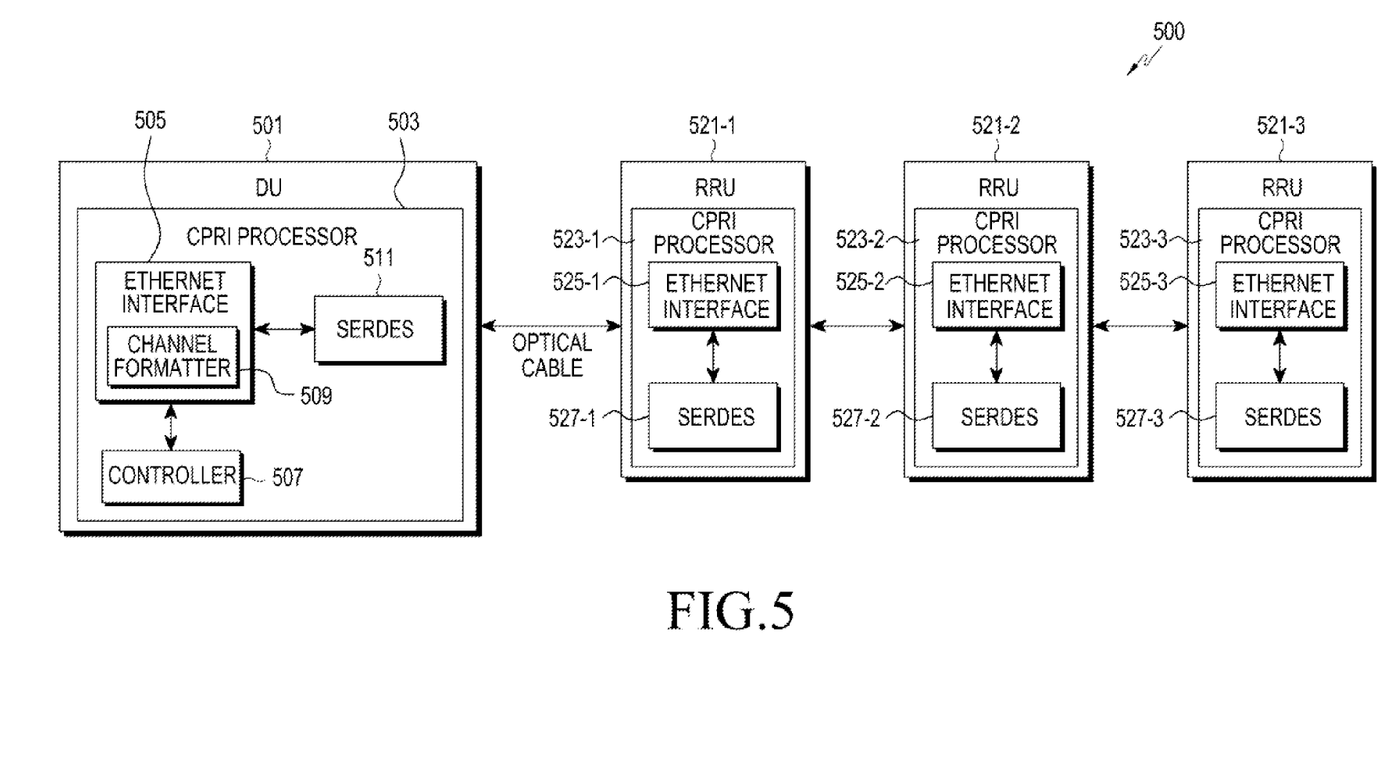
FIG. 5 is a diagram illustrating an interface structure of a C&M channel according to an exemplary embodiment of the present invention.

FIG. 5 illustrates an interface structure of a C&M channel according to an exemplary embodiment of the present invention.

Referring to FIG. 5, a base station 500 includes one DU 501 and a plurality of RRUs 521_1~521_3. The one DU 501 and the plurality of RRUs 521_1~521_3 are combined in the form of a cascade, and these units are connected by optical cables. The one DU 501 and the plurality of RRUs 521_1~521_3 are connected (or interfaced) through at least one CPRI link, and one C&M channel exists in one CPRI link. Although Ethernet or HDLC may be used to support a C&M channel in the CPRI link, it is assumed in the following description that an Ethernet channel is used.

A CPRI processor 503 in the DU 501 includes an Ethernet interface module 505, a controller 507, and an SERDES 511. The Ethernet interface module 505 may include a channel formatter 509. The channel formatter 509 may be installed not only inside but also outside the Ethernet interface module 505.

To support a C&M channel, the controller 507 allocates an Ethernet channel and transfers setting information of a protocol related to a plurality of RRUs, to the plurality of RRUs. The controller 507 determines the number of Ethernet channels to be used, depending on the number of RRUs connected to (or interfacing with) the DU 501, and provides information about the determined number of RRUs to the Ethernet interface module 505. The controller 507 sets (or records) an Ethernet start pointer value and/or an Ethernet end pointer value that should be applied according to the location of each RRU, in the final CW 'P' of the subchannel #2 or its corresponding region of the vendor-specific subchannel so that information about the Ethernet start pointer and/or Ethernet end pointer may be transferred to a plurality of RRUs. The DU 501 transmits, to a plurality of RRUs, a radio frame in which the controller 507 has set information associated with a plurality of Ethernet channels in an arbitrary subchannel as described above, thereby making it possible to transmit a C&M channel using a plurality of Ethernet channels.

Figure 6:
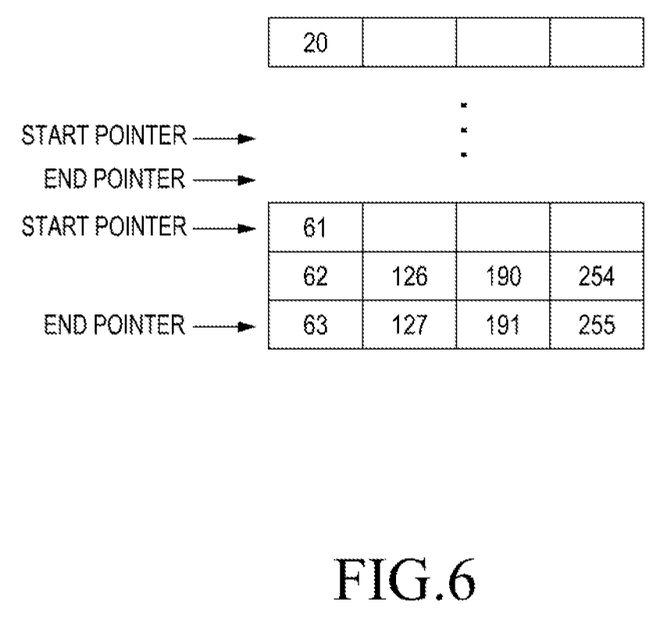
FIG. 6 is a diagram illustrating setting of a plurality of Ethernet pointers according to an exemplary embodiment of the present invention.

FIG. 6 illustrates setting of a plurality of Ethernet pointers according to an exemplary embodiment of the present invention.

Referring to FIG. 6, the controller 507 sets a plurality of Ethernet pointers in order to divide one Ethernet channel into a plurality of Ethernet channels according to the layout form of RRUs (for example, the number of RRUs, the layout form (star or cascade), etc.). The controller 507 may divide one Ethernet channel into a plurality of Ethernet channels by using a plurality of Ethernet start pointers and Ethernet end pointers on subchannels of a hyperframe, and may allocate the plurality of divided Ethernet channels to RRUs connected to the DU.

The Ethernet interface module 505 supports processing of Ethernet data for controlling and managing the plurality of RRUs 521_1~521_3. The Ethernet interface module 505 multiplexes Ethernet data streams for the RRUs 521_1~521_3 in the form of an Ethernet protocol for transmission thereof, and may support a rate of a maximum of 211.2 Mbps.

The channel formatter 509 in the Ethernet interface module 505 allocates each Ethernet data in a specific location of a CPRI radio frame. The channel formatter 509 divides one Ethernet channel into a plurality of Ethernet channels using information about a plurality of Ethernet pointers, provided from the controller 507, and multiplexes and demultiplexes Ethernet data for the divided Ethernet channels.

Conventionally, one Ethernet channel is set according to CPRI line bit rates of 20 Mbps/40 Mbps/80 Mbps~211 Mbps. However, according to an exemplary embodiment of the present invention, a plurality of Ethernet channels are set according to the cascade form in which RRUs are connected to a DU, and channel formatting is performed according to the start pointer and end pointer of each Ethernet channel, which are set by the controller 507 as described in connection with FIG. 5.

The SERDES 511 serializes data input from the Ethernet interface module 505 and data input from other interfaces (not shown), and transmits the serialized data stream to the plurality of RRUs 521_1~521_3.

SERDESs 527_1~527_3 in the plurality of RRUs 521_1~521_3 deserialize the data stream transmitted from the DU 501, and provide the deserialized data streams to Ethernet interface modules 525_1~525_3.

The conventional Ethernet interface module has an Ethernet switch for controlling a flow of an Ethernet path. According to an exemplary embodiment of the present invention, because the DU 501 and the plurality of RRUs 521_1~521_3 are directly interfaced through a predetermined path, the Ethernet interface modules 525_1~525_3 may receive their Ethernet data through their Ethernet channels despite the absence of Ethernet switches.

The plurality of RRUs 521_1~521_3 and the DU 501 share information about Ethernet channels allocated to the RRUs. Each of the plurality of RRUs 521_1~521_3 detects location information of an Ethernet channel allocated thereto, from the radio frame provided from the DU 501, and receives Ethernet data over the Ethernet channel allocated thereto using the detected location information. Each of the plurality of RRUs 521_1~521_3 may receive partial Ethernet data allocated thereto, from among the Ethernet data received from the DU 501.

By dividing one Ethernet channel allocated in a CPRI link into a plurality of Ethernet channels according to the layout form of RRUs in this manner, an exemplary embodiment of the present invention can improve usage of Ethernet channels and control a plurality of RRU paths with one Ethernet channel.

In addition, by removing an Ethernet switch which is used in each RRU stage to control an Ethernet flow, an exemplary embodiment of the present invention may improve competitiveness in terms of system price and design. Even in terms of stabilization of the system, if the existing Ethernet switches are used and a processor or a switch in the first stage malfunctions, paths of all cascaded C&M channels may be interrupted, whereas the present invention can control a rear-stage processor regardless of the operation of a front-stage processor, improving the system reliability.

Figure 7:
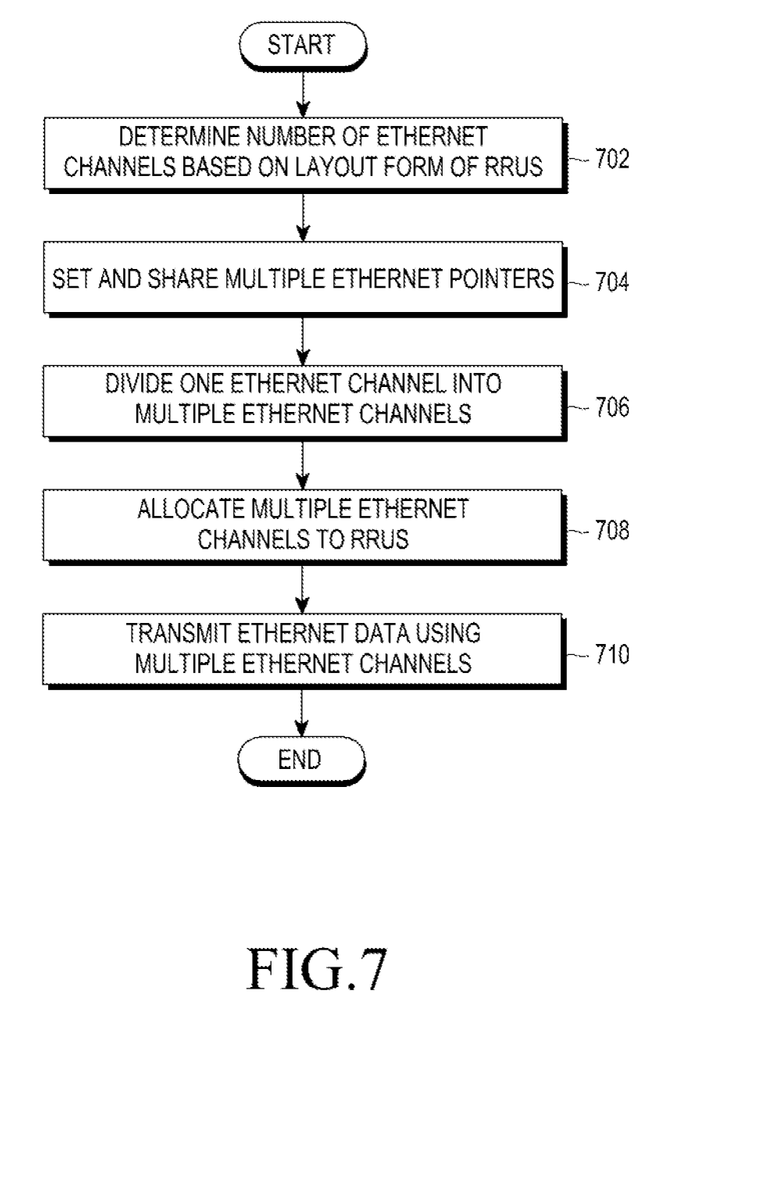
FIG. 7 is a diagram illustrating a procedure for allocating Ethernet channels in a base station according to an exemplary embodiment of the present invention.

FIG. 7 illustrates a procedure for allocating Ethernet channels in a base station according to an exemplary embodiment of the present invention.

Referring to FIG. 7, a DU determines the number of Ethernet channels to be used for transmission of Ethernet data based on a layout form of RRUs connected thereto (for example, the number of RRUs, the layout form (star or cascade), etc.) in step 702. The DU determines how many Ethernet channels to use, depending on the number of RRUs.

When the number of Ethernet channels is determined, the DU sets a plurality of Ethernet pointers for distinguishing Ethernet channels to be allocated to a plurality of RRUs, and transmits information about the set Ethernet pointers to the plurality of RRUs, in step 704. As a result, the DU and the plurality of RRUs may share information about the plurality of Ethernet pointers, and the plurality of RRUs may detect partial Ethernet data allocated thereto from among the Ethernet data received from the DU. Setting the plurality of Ethernet pointers may include defining start pointer values and end pointer values of subchannels in subchannel regions of a hyperframe.

In step 706, the DU divides one Ethernet channel into a plurality of Ethernet channels using the plurality of Ethernet pointers. In step 708, the DU allocates the plurality of divided Ethernet channels to their associated RRUs.

In step 710, the DU transmits Ethernet data to the plurality of RRUs using the plurality of divided Ethernet channels. The DU transmits a radio frame that uses a plurality of Ethernet channels to the plurality of RRUs.

Figure 8:
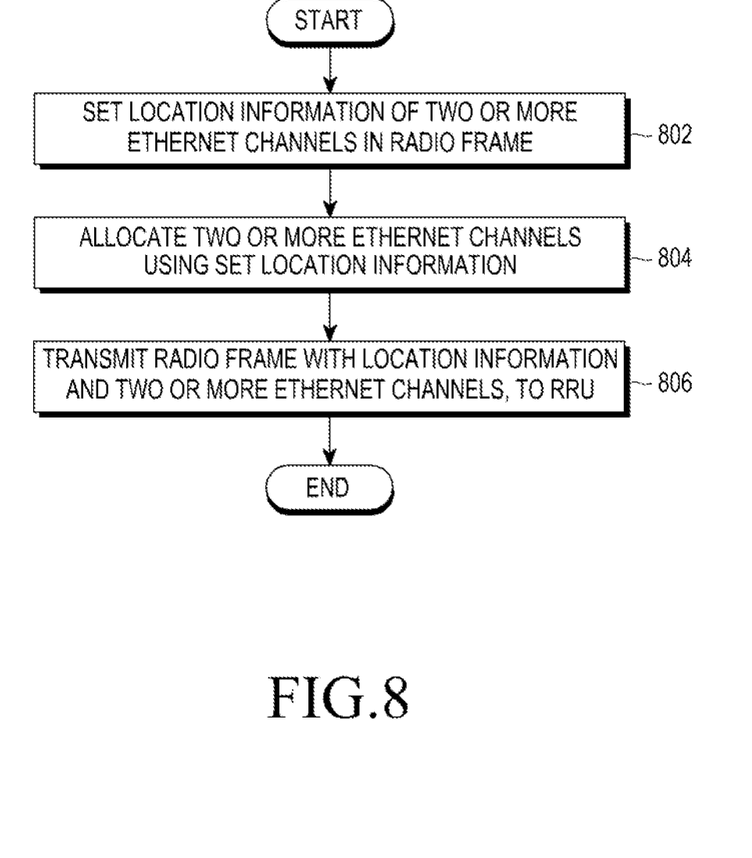
FIG. 8 is a diagram illustrating a process of transmitting Ethernet data in a Digital Unit (DU) according to an exemplary embodiment of the present invention.

FIG. 8 illustrates a process of transmitting Ethernet data in a DU according to an exemplary embodiment of the present invention.

Referring to FIG. 8, a controller of a DU sets (or records) location information for two or more Ethernet channels in an arbitrary subchannel in a radio frame in step 802. Optionally, the arbitrary subchannel may be the final CW, which is reserved for an Ethernet pointer 'P' in a second subchannel of a hyperframe constituting a CPRI radio frame. Optionally, the arbitrary subchannel may be a vendor-specific subchannel of a hyperframe of a CPRI radio frame.

An Ethernet interface module in the DU allocates two or more Ethernet channels to two or more RRUs individually using the set location information in step 804, and transmits a radio frame containing Ethernet data for the RRUs associated with the allocated Ethernet channels in step 806.

Figure 9:
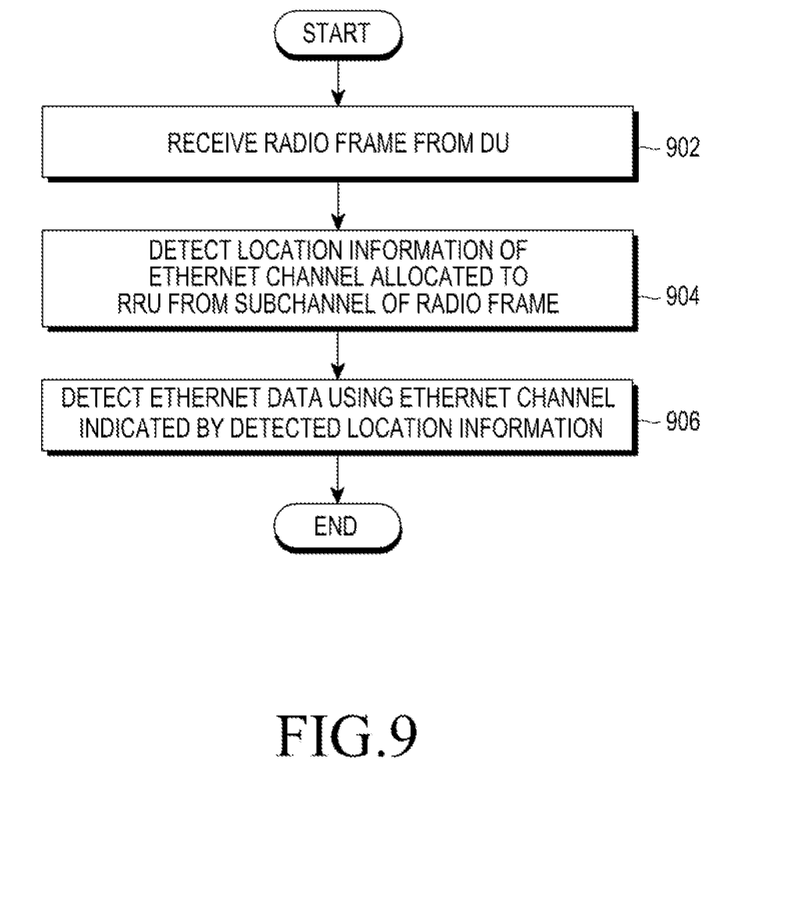
FIG. 9 is a diagram illustrating a process of receiving Ethernet data in a Remote Radio Frequency Unit (RRU) according to an exemplary embodiment of the present invention.

FIG. 9 illustrates a process of receiving Ethernet data in an RRU according to an exemplary embodiment of the present invention.

Referring to FIG. 9, an Ethernet interface module in an RRU receives a radio frame from a DU through an SERDES in the RRU in step 902.

In step 904, the Ethernet interface module detects location information of an Ethernet channel allocated thereto (i.e., allocated to the RRU) from location information of a plurality of Ethernet channels, which is set (or recorded) in a specific subchannel of the received radio frame. Optionally, the specific subchannel may be the final CW, which is reserved for an Ethernet pointer 'P' in a second subchannel of a hyperframe constituting a CPRI radio frame. Optionally, the specific subchannel may be a vendor-specific subchannel of a hyperframe of a CPRI radio frame.

In step 906, the Ethernet interface module receives its Ethernet data through an Ethernet channel indicated by the detected location information.

Through the above process, exemplary embodiments of the present invention may divide one Ethernet channel into a plurality of Ethernet channels by setting a plurality of Ethernet pointers, and improve usage of Ethernet channels by transmitting Ethernet data over the plurality of divided Ethernet channels.

As is apparent from the foregoing description, by dividing one Ethernet channel allocated to a CPRI link into a plurality of Ethernet channels according to the layout form of RRUs, an exemplary embodiment of the present invention can improve usage of Ethernet channels and control Ethernet paths for a plurality of RRUs with one Ethernet channel. An example of efficiently using C&M channels in a CPRI interface system has been shown in the foregoing description. However, exemplary embodiments of the present invention may be applied not only to the CPRI technology, but also to all Ethernet path-related technologies.

In addition, by removing an Ethernet switch used in each RRU stage to control an Ethernet flow, an exemplary embodiment of the present invention may reduce the economic cost of the system and improve the reliability of the system.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for transmitting Ethernet data in a Digital Unit (DU) that processes a baseband and interfaces with at least two Radio Frequency (RF) Units (RUs), the method comprising:
    setting location information of two or more Ethernet channels for control and management data in a first subchannel of a radio frame;
    allocating, respectively, the two or more Ethernet channels in second subchannels of the radio frame, based on the location information; and
    transmitting the radio frame to each of the at least two RUs.

2. The method of claim 1, wherein the radio frame comprises a Common Public Radio Interface (CPRI) radio frame.

3. The method of claim 2, wherein the subchannel including location information comprises a vendor-specific subchannel.

4. The method of claim 1, wherein the location information comprises information about an Ethernet start pointer and an Ethernet end pointer for separating the second subchannel of the radio frame into two or more Ethernet channels.

5. The method of claim 1, wherein the allocating of the Ethernet channels comprises:
    allocating the two or more Ethernet channels for the at least two RUs in the second subchannels; and
    multiplexing the allocated two or more Ethernet channels.

6. The method of claim 1, wherein the RU comprises a Remote RF Unit (RRU).

7. A Digital Unit (DU) for transmitting Ethernet data and for processing a baseband and interfacing with at least two Radio Frequency (RF) Units (RUs), the DU comprising:
    a controller for setting location information of two or more Ethernet channels for control and management data in a first subchannel of a radio frame; and
    an Ethernet interface module for allocating, respectively, the two or more Ethernet channels in second subchannels of the radio frame, based on the location information, and transmitting the radio frame to each of the at least two RUs.

8. The DU of claim 7, wherein the radio frame comprises a Common Public Radio Interface (CPRI) radio frame.

9. The DU of claim 8, wherein the subchannel including location information comprises a vendor-specific subchannel.

10. The DU of claim 7, wherein the location information comprises information about an Ethernet start pointer and an Ethernet end pointer for separating the second subchannel of the radio frame into the two or more Ethernet channels.

11. The DU of claim 7, wherein to allocate the Ethernet channels, the Ethernet interface module allocates the two or more Ethernet channels for the at least two RUs in the second subchannels, and multiplexes the allocated at least two or more Ethernet channels.

12. The DU of claim 7, wherein the RU comprises a Remote RF Unit (RRU).

13. A method for receiving Ethernet data in a Radio Frequency (RF) Unit (RU) that processes a radio signal and interfaces with a Digital Unit (DU), the method comprising:
receiving a radio frame from the DU;
detecting location information of an Ethernet channel for control and management data allocated to the RU from location information of, respectively, each of at least two or more Ethernet channels, which are set in a subchannel of the radio frame; and
detecting Ethernet data based on the Ethernet channel indicated by the detected location information.

14. The method of claim 13, wherein the radio frame comprises a Common Public Radio Interface (CPRI) radio frame.

15. The method of claim 14, wherein the subchannel including location information comprises a vendor-specific subchannel.

16. The method of claim 13, wherein the detected location information comprises information about an Ethernet start pointer and an Ethernet end pointer, which point to a location of an Ethernet channel allocated to the RU in the radio frame.

17. The method of claim 13, wherein the receiving of the radio frame from the DU comprises:
receiving a data stream from the DU; and
demultiplexing the received data stream.

18. The method of claim 13, wherein the RU comprises a Remote RF Unit (RRU).

19. A Radio Frequency (RF) Unit (RU) for receiving Ethernet data and for processing a radio signal and interfacing with a Digital Unit (DU), the RU comprising:
an Ethernet interface module for receiving a radio frame from the DU, for detecting, in a subchannel of a radio frame, location information of an Ethernet channel for control and management data allocated to the RU from location information of, respectively, each of at least two or more Ethernet channels, which is set in a subchannel of the radio frame, and for detecting Ethernet data based on an Ethernet channel indicated by the detected location information.

20. The RU of claim 19, wherein the radio frame comprises a Common Public Radio Interface (CPRI) radio frame.

21. The RU of claim 20, wherein the subchannel including location information comprises a vendor-specific subchannel.

22. The RU of claim 19, wherein the detected location information comprises information about an Ethernet start pointer and an Ethernet end pointer, which point to a location of an Ethernet channel allocated to the RU in the radio frame.

23. The RU of claim 19, wherein to receive the radio frame, the Ethernet interface module receives a data stream from the DU and demultiplexes the received data stream.

24. The RU of claim 19, wherein the RU comprises a Remote RF Unit (RRU).

25. A base station comprising: a Digital Unit (DU) including a controller for setting location information of two or more Ethernet subchannels for control and management data in a first subchannel of a radio frame and an Ethernet interface module for allocating, respectively, the two or more Ethernet channels in second subchannels of the radio frame based on the location information, and for transmitting the radio frame; and
at least two Radio Frequency Units (RUs), each of the at least two RUs including an Ethernet interface module for receiving the radio frame from the DU, for detecting the location information, and for detecting Ethernet data based on an Ethernet channel indicated by the location information.

26. The base station of claim 25, wherein the detected information comprises information about an Ethernet start pointer and an Ethernet end pointer, which point to a location of an Ethernet channel allocated to the RU in the radio frame.

* * * * *